Feb. 23, 1937.  R. F. BUCHHOLZ  2,071,330
THREE-POINT SUSPENSION FOR TANK TRUCKS
Filed Aug. 12, 1933  2 Sheets-Sheet 1
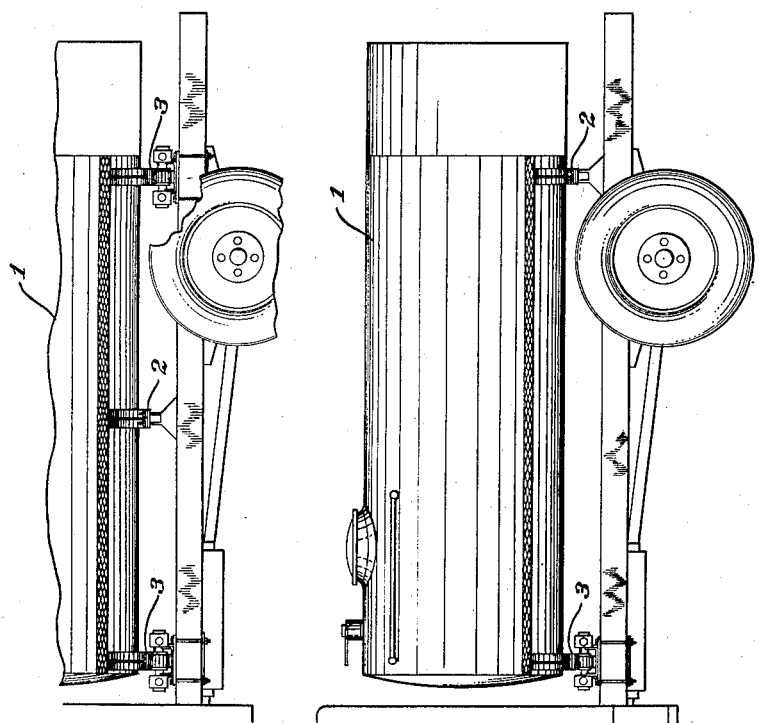
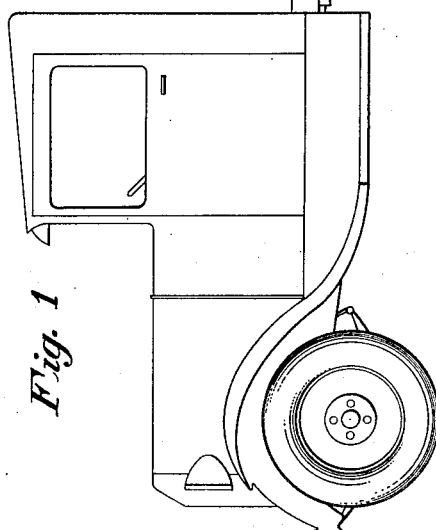
Inventor
René F. Buchholz
By his Attorney Feb. 23, 1937. R. F. BUCHHOLZ 2,071,330
THREE-POINT SUSPENSION FOR TANK TRUCKS
Filed Aug. 12, 1933 2 Sheets-Sheet 2
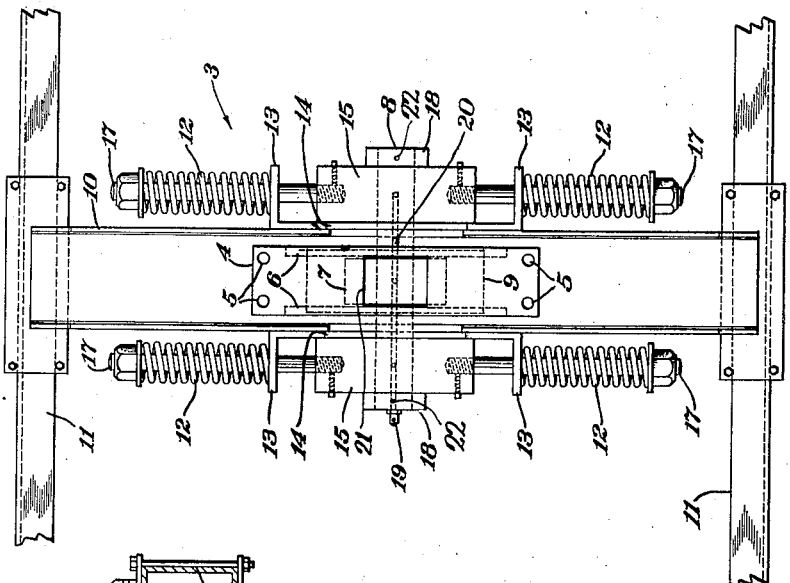
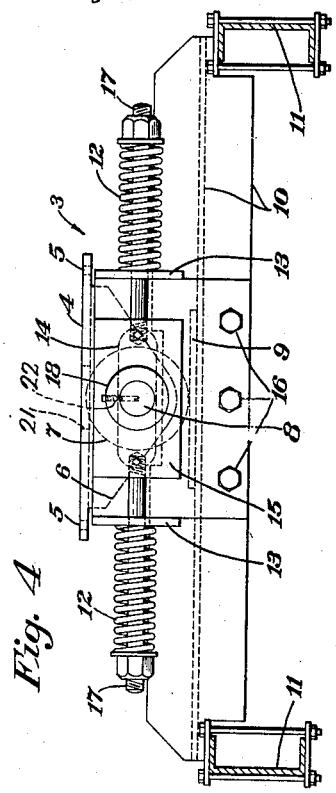
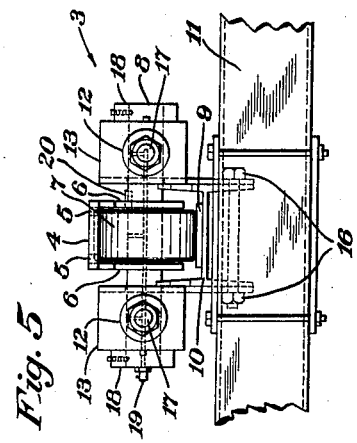
Inventor
René F. Buchholz
By *[signature]*
his Attorney Patented Feb. 23, 1937

2,071,330

UNITED STATES PATENT OFFICE 2,071,330

THREE-POINT SUSPENSION FOR TANK TRUCKS

René F. Buchholz, Philadelphia, Pa., assignor to The Atlantic Refining Company, Philadelphia, Pa., a corporation of Pennsylvania Application August 12, 1933, Serial No. 684,865

10 Claims. (Cl. 280—5)

This invention relates to tank truck mountings, particularly tanks such as are mounted on motor trucks, and which, for example, are suitable for making deliveries of petroleum oils or the like.

It is an object of my invention to provide a mounting which will eliminate tortional stresses in the tank and also in the chassis. To this end, it is an object of my invention to mount the tank on the chassis frame so as to permit pivotal and lateral motion of the chassis frame relative to the tank. It is also an object of my invention to provide a mounting fixture of a type which will permit this motion. These and other objects and features of the invention falling within the scope of the appended claims will be apparent to those skilled in the art from the following description.

When the tank is firmly and rigidly attached throughout its length to the chassis, high tortional stresses are set up in the walls of the tank when, for example, the truck wheels pass over an uneven road. These stresses tend to break the seams and/or shear the rivets of the tank, thereby causing leakage and short life. Also, such rigid connection prevents the chassis frame from being flexible enough to readily bend into positions so that the weight will be substantially evenly distributed on the four wheels of the truck when the same is passing over uneven surfaces.

Suggestions have been made in the past to mount tanks so that one end is rigidly fastened in a saddle to one end of the chassis frame, and the other end thereof is pivotally mounted on such frame, thereby to minimize torsional stresses. Such mounting while it relieves a portion of the stresses incident to rigidly mounting a tank on the chassis frame, is ineffective in relieving a substantial portion of stresses which may be set up. Such connection only takes care of the motion of the frame around a horizontal axis, longitudinally of the truck.

I have discovered that in passing over a rough road, when one wheel is elevated higher than another, in addition to twisting of the frame relative to a horizontal axis running longitudinally of the truck, there is also twisting of the framework relative to a vertical axis in the vicinity of the source of stress. That is, in such case, a shearing force is exerted on the pivot bolt of a rigid pivotal connection. The bolt, of course, is made of sufficient diameter to resist the shearing force, and the stress is therefore transmitted to the walls of the tank and to the framework of the chassis. This action loosens the seams of the tank causing leakage and in addition acts to weaken and rack the frame of the chassis.

The preferred embodiment of my invention provides for a rigid connection of the tank to the chassis frame at one section along its length, for example, by supporting one end of the tank in a saddle. The tank is supported at another or other point or points so as to provide for both pivotal motion and restricted lateral motion of the tank relative to the chassis frame. When the tank is mounted on the chassis frame in the manner aforesaid, stresses and strains due to the mounting are substantially completely eliminated both in the walls of the tank and in the chassis frame. The frame may flex relative to a longitudinal horizontal axis and also relative to a vertical axis in the vicinity of the source of stress, independently of the tank.

I may prefer to mount the tank by means of a rigidly fastened saddle at its mid-section, said saddle in turn being rigidly secured to the chassis frame. In this case I would support both ends of the tank on my pivotal mounting fixtures and thereby eliminate unnecessary stresses upon the tank and chassis. This system of mounting is particularly desirable for tanks which are longer and heavier than usual and which must be supported at the mid-section as well as at the ends.

Reference is had to the accompanying drawings to illustrate the mode of mounting and the features of my device for permitting both the pivotal and lateral motion of the tank relative to the chassis frame.

Figs. 1 and 2 are side views of tanks mounted in accordance with my invention;

Fig. 3 is a plan view of the mounting fixture or connection on which the tank rests, and which permits lateral and pivotal motion of the tank relative to the chassis frame;

Fig. 4 is a side view of my mounting fixture, connected to the cross bar which is fastened to the two sides of the chassis frame;

Fig. 5 is an end view of the mounting fixture.

In Fig. 1, the tank 1 is shown rigidly supported in saddle 2, adjacent one end of the tank, the saddle conforming to the shape of the tank. Adjacent its other end the tank is mounted on mounting fixture 3, which in turn is rigidly fastened to the frame of the chassis. Mounting fixture 3 permits both pivotal and lateral motion of the end of tank 1 to which it is connected, relative to the chassis frame, said pivotal motion occurring about a longitudinal axis substantially centrally of the bottom of the tank.

In Fig. 2, the tank 1 is shown rigidly supported in its mid-section by saddle 2, the saddle conforming to the shape of the tank, and rigidly fastened to the chassis frame. The ends of the tank are suported by mounting fixtures 3, which in turn are rigidly fastened to the chassis frame. The mounting fixtures 3 permit both pivotal and lateral motion of the respective ends of the tank relative to the chassis, said pivotal motion occurring about a longitudinal axis substantially centrally of the bottom of the tank.

In Figs. 3, 4, and 5, horizontal plate 4 of the mounting fixture 3 contains bolt holes 5 through which framework supporting an end of the tank is bolted. Rigidly fixed to plate 4 are downwardly extending members 6 spaced from each other to receive roller 7 therebetween. Members 6 and roller 7 have drill holes or openings to permit shaft 8 to pass therethrough. The housing, consisting of horizontal plate 4, slotted at 21 to accommodate the upper portion of roller 7, and members 6, is preferably keyed to shaft 8 by means of key 20, although in some instances the housing may be freely rotatable with respect to said shaft. Roller 7 may or may not be rotatably mounted on shaft 8, but preferably is mounted to permit rotation of the roller with respect to the shaft. In the event that the housing is keyed to shaft 8, the roller 7 must be free to rotate on shaft 8. Shaft 8 is provided at both ends with lock collars 18 secured to the shaft by set-screws 22, and at one end with lubricating attachment 19. Roller 7 rests on plate 9 and is adapted to roll back and forth thereon to permit lateral motion of the tank relative to the chassis frame. The weight of the tank which rests on horizontal plate 4 is transmitted therefrom through members 6 to shaft 8 and thence to roller 7 and plate 9 on which roller 7 rests, and thence through the horizontal cross piece 10 which connects at each end with a side of the chassis frame 11.

Unnecessary lateral motion of the tank relative to the chassis frame is prevented by springs 12 which act to damp the lateral movement of the roller 7 back and forth on plate 9, and thereby maintain the tank in its proper position. Flanged irons 13 which are inserted between springs 12, on either side of the horizontal cross piece 10, are provided with horizontal slots 14 to permit horizontal movement of the shaft 8. Blocks 15, drilled and tapped to adapt bolts 17, and drilled also to accommodate shaft 8, are mounted on either end of shaft 8 adjacent the flanged irons 13, and are held in position on shaft 8 by the bolts 17 which pass freely through holes drilled through the flanged portion of irons 13. The blocks 15 are pivotally mounted or journalled on the shaft 8 and are movable in the direction of movement of the roller 7, i. e., laterally. However, this movement is restricted, as can particularly be seen in Fig. 3, by the action of the springs 12 which tend to keep the roller centered in its predetermined position. The flanged irons 13 are firmly fastened, for example, by bolts 16, to the horizontal cross piece 10 which extends between the two sides of the chassis frame and which also is preferably of channel design. The blocks 15 located within the turned out ends of flanged irons 13 are each internally threaded at either side to receive bolts 17 thereby providing a means whereby the tension on springs 12 may be maintained and adjusted as desired. Also, the blocks 15 serve to transmit the lateral movement of roller 7 to the springs 12, and are the means through which the latter exert their damping or stabilizing force on the former. Pivoting motion of the tank is transmitted through the roller housing consisting of plate 4 and members 6, keyed to shaft 8 by key 20. Shaft 8 has as bearings, the roller 7 and blocks 15 in which said shaft is free to rotate, said shaft constituting the axis about which pivotal motion of the roller housing may occur. Instead of the two sets of springs 12 and flanged irons 13, one on each side of the roller 7, I may modify my mounting so that only one set of springs and one flanged iron is required, such springs and flanged iron being considerably stronger and heavier than those mentioned in the above description.

The above described connection provides a very sturdy support for the heavy weight of loaded oil tanks and has been found to very satisfactorily eliminate stresses which are normally set up in the walls of the tank and in the chassis frame when no lateral motion of one relative to the other is permitted.

I claim:

1. In tank wagon construction, a flexible chassis frame, an elongated tank adapted to be supported thereon, a rigid support between the frame and the tank at one section along the length of the tank, and means for supporting the tank on the frame at at least one point remote from said rigid support to permit lateral and pivotal motion of said tank with respect to said frame, said pivotal motion occurring about a longitudinal axis substantially centrally of the bottom of said tank thereby to permit free flexing of said frame independently of said tank, and means cooperating therewith and exerting a lateral force tending to urge the tank from either side back to a predetermined position with respect to said chassis frame.

2. In tank wagon construction, a flexible chassis frame, an elongated tank adapted to be supported thereon, a rigid support between the frame and the tank at one section along the length of the tank, and means for supporting the tank on the frame at at least one point remote from the aforesaid support which permits pivotal and lateral movement of the tank with respect to the frame, said latter supporting means comprising a roller resting upon a plate rigidly affixed to a cross-piece of the aforesaid flexible frame, said roller being adapted to roll laterally of said frame to permit lateral and pivotal motion of the tank with respect to the frame, a shaft journalled in said roller, and a housing keyed to said shaft and supporting said tank, thereby transmitting the weight of said tank through said shaft to said roller and said plate and thence to the cross-piece of said flexible frame.

3. In tank wagon construction, a flexible chassis frame, an elongated tank adapted to be supported thereon, a rigid support between the frame and the tank at one section along the length of the tank, and means for supporting the tank on the frame at at least one point remote from the aforesaid support which permits pivotal and restricted lateral movement of the tank with respect to the frame, said latter supporting means comprising a roller resting upon a plate rigidly affixed to a cross-piece of the aforesaid flexible frame, said roller being adapted to roll laterally of said frame to permit lateral and pivotal motion of the tank with respect to the frame, a shaft journaled in said roller, a housing keyed to said shaft and supporting said tank, whereby the weight of said tank is transmitted through said shaft to said roller and said plate and thence to the cross-piece of said flexible frame, and means acting to urge the roller from a position of lateral displacement on either side of its predetermined normal position relative to the frame, back to said predetermined normal position.

4. In tank wagon construction, a flexible chassis frame, an elongated tank adapted to be supported thereon, a rigid support between the frame and the tank at one section along the length, and means for supporting the tank on the frame at at least one point remote from the aforesaid supporting means to permit pivotal and restricted lateral movement of the tank with respect to the frame, said latter supporting means comprising a member attached to and extending cross-wise of said frame, a roller resting upon said member centrally thereof and adapted to roll laterally with respect to said frame to permit lateral and pivotal motion of the tank with respect to the frame, horizontally slotted members having flanges turned out at either end rigidly affixed to each side of said cross-wise member centrally thereof, a shaft journalled in said roller and extending both ways through said horizontal slots, and a housing keyed to and supported on said shaft on either side of said roller and affixed to and supporting said tank, thereby transmitting the weight of said tank through said shaft to said roller and thence to its supporting base, the aforesaid horizontal slots permitting lateral movement of the tank relative to the frame within limits and serving to hold the roller firmly down on its supporting member.

5. In tank wagon construction, a flexible chassis frame, an elongated tank adapted to be supported thereon, a rigid support between the frame and the tank at one section along the length of the tank, and means for supporting the tank on the frame at at least one point remote from the aforesaid supporting means to permit pivotal and restricted lateral movement of the tank with respect to the frame, said latter supporting means comprising a member attached to and extending cross-wise of said frame, a roller resting upon said member centrally thereof and adapted to roll laterally with respect to said frame to permit lateral and pivotal motion of the tank with respect to the frame, horizontally slotted members having flanges turned out at either end rigidly affixed to each side of said cross-wise member centrally thereof, a shaft journalled in said roller and extending both ways through said horizontal slots, blocks mounted on either end of said shaft, said shaft being rotatable within said blocks, springs supported respectively against a flange of said slotted members and being connected to a respective one of said blocks, so as to tend to maintain said shaft in a normal centralized position within the slots of said slotted members, and a housing keyed to and supported on said shaft on either side of said roller and affixed to and supporting said tank, thereby transmitting the weight of said tank through said shaft to said roller and thence to its supporting member, the aforesaid horizontal slots permitting lateral movement of the tank relative to the frame to relieve stresses therebetween and said springs acting to return the tank to its normal lateral position relative to the frame when said stresses disappear.

6. In tank wagon construction, a flexible chassis frame, an elongated tank adapted to be supported thereon, a rigid support between the frame and the tank at one section along the length of the tank, and means for supporting the tank on the frame at at least one point removed from the aforesaid supporting means to permit pivotal and restricted lateral movement of the tank with respect to the frame, said latter supporting means comprising, a member attached to and extending cross-wise of said frame, a roller resting thereon and freely movable relative thereto laterally with respect to said frame, a shaft journalled in said roller, a housing keyed to said shaft and fastened to and supporting said tank, and yielding means adapted to urge said roller from a position of lateral displacement on either side of a predetermined normal position back to said normal position.

7. In tank wagon construction, a flexible chassis frame, an elongated tank adapted to be supported thereon, a rigid support between the frame and the tank at one section along the length of the tank, and a support between the frame and the tank at at least one point remote from said rigid support, said latter support comprising a member supported by said frame and freely movable in a lateral direction with respect thereto, and a housing pivotally mounted on said member and fastened to and supporting said tank, thereby permitting free pivotal and lateral movement of said frame with respect to said tank.

8. A mounting fixture adapted to support a tank at a point along its length, which comprises a smooth base, a roller supported on said smooth base to roll back and forth thereon, said base being adapted to be rigidly fastened to a vehicle frame, a shaft extending through said roller centrally thereof, and a housing member adapted to be connected to and to support the tank, said housing being supported on said shaft on either side of said roller.

9. A mounting fixture adapted to support a tank at a point along its length, which comprises a smooth base, a roller supported on said smooth base, a member supporting said smooth base and supported at each end by a vehicle frame, horizontally slotted members affixed to the aforesaid member on either side thereof adjacent said smooth base, a shaft extending through said roller and slots, so as to transmit downward forces to said roller and thence to its smooth base, and a housing member adapted to be connected to and to support the tank, said housing being supported on said shaft on either side of said roller.

10. A mounting fixture adapted to support a tank at a point along its length, which comprises a smooth base, a roller supported on said smooth base, a member supporting said smooth base and supported at either end by a vehicle frame, horizontally slotted members rigidly affixed to the aforesaid member on either side thereof and adjacent said smooth base, either end of each slotted member being turned out from the aforesaid member substantially at right angles thereto, each of said turned out ends having a horizontal perforation substantially parallel to aforesaid member, a block located between said turned out ends of each of said slotted members, a spring located outside of each turned out end, a rod extending through each spring, through the opening in the respective turned out end and affixed to said block so as to exert a force to maintain the block in a predetermined position centrally of the slot of the respective slotted member, a shaft extending through said roller and through the slots of said slotted members, and having each of said blocks rotatably mounted respectively on either end thereof, and a housing connected to and supporting the tank, supported on said shaft on either side of said roller, said housing having downwardly extending paired members having aligned openings therein through which the said shaft passes.

RENÉ F. BUCHHOLZ.